US012678918B2

(12) United States Patent
Murphy et al.

(10) Patent No.: US 12,678,918 B2
(45) Date of Patent: Jul. 14, 2026

(54) SPOILBOARD GASKET TILE SYSTEM FOR INCREASED WORK-HOLD VACUUM PRESSURE

(71) Applicants: Michael Conor Murphy, Nevada City, CA (US); John Murphy, Rehoboth, MA (US)

(72) Inventors: Michael Conor Murphy, Nevada City, CA (US); John Murphy, Rehoboth, MA (US)

( * ) Notice: Subject to any disclaimer, the term of this patent is extended or adjusted under 35 U.S.C. 154(b) by 0 days.

(21) Appl. No.: 18/096,002

(22) Filed: Jan. 11, 2023

(65) Prior Publication Data

US 2023/0234189 A1 Jul. 27, 2023

Related U.S. Application Data

(60) Provisional application No. 63/298,397, filed on Jan. 11, 2022.

(51) Int. Cl.
*B25B 11/00* (2006.01)

(52) U.S. Cl.
CPC .................................. *B25B 11/005* (2013.01)

(58) Field of Classification Search
CPC ..... B25B 11/00; B25B 11/005; B25B 11/007; B23Q 3/08; B23Q 3/088; B23Q 3/084; H01L 21/6838; B26D 7/20; Y10S 83/941; B25J 15/0616
USPC ............ 269/20, 21; 29/559; 279/3; 294/183, 294/188; 451/388
See application file for complete search history.

(56) References Cited

U.S. PATENT DOCUMENTS

| | | | | |
|---|---|---|---|---|
| 5,493,767 | A | 2/1996 | Susnjara | |
| 5,987,729 | A | 11/1999 | Moran | |
| 6,182,956 | B1 * | 2/2001 | McMillan | B25B 11/005 269/21 |

(Continued)

FOREIGN PATENT DOCUMENTS

| | | |
|---|---|---|
| CN | 104440325 | 3/2015 |

OTHER PUBLICATIONS

Author: Gaska Tape Inc. Title: V1100 Series Publication Date: Oct. 27, 2021 URL: https://web.archive.org/web/20211027221655/https://www.gaska.com/gaska_product/v1100-series/ (Year: 2021).*

*Primary Examiner* — Brian D Keller
*Assistant Examiner* — Alberto Saenz
(74) *Attorney, Agent, or Firm* — Lee & Hayes, P.C.

(57) ABSTRACT

In one embodiment, a spoilboard gasket tile system for increased work-hold vacuum pressure is provided. In particular, a universal work-hold gasketing solution is defined for vacuum table machining processes that can be used in a variety of sizes and applications, where the surface of a porous spoilboard (e.g., MDF/LDF or a porous plastic) is covered by a non-porous gasketing sheet (e.g., an adhesive foam layer) that is configured with a plurality of spaced apertures (holes) sized and located to create a corresponding plurality of focused vacuum passageways to suction clamp any workpiece placed thereon. In one particular embodiment, the spoilboard with gasketing are prepared as an interchangeable tile unit, allowing for dynamic configuration and reconfiguration of an array of spoilboard gasket tiles to cover a vacuum table, as well as for replacement of specific tiles as needed based on localized wear of the tiles.

10 Claims, 11 Drawing Sheets

(56) References Cited

U.S. PATENT DOCUMENTS

| | | | | |
|---|---|---|---|---|
| 6,419,216 | B1 | 7/2002 | Susnjara | |
| 7,035,707 | B2 | 4/2006 | Susnjara et al. | |
| 7,134,817 | B2 | 11/2006 | Kado et al. | |
| 7,185,412 | B2 | 3/2007 | Penick et al. | |
| 8,641,337 | B2 | 2/2014 | Epplin et al. | |
| 9,440,321 | B2 | 9/2016 | Susnjara | |
| 11,052,536 | B2 | 7/2021 | Jetté et al. | |
| 11,667,030 | B2 | 6/2023 | Jetté et al. | |
| 2013/0127194 | A1* | 5/2013 | Regan | A43D 11/00 294/188 |
| 2013/0284355 | A1* | 10/2013 | Farrage, Jr. | E04F 13/0862 156/247 |
| 2015/0013514 | A1* | 1/2015 | Strauss | F41H 5/0442 269/21 |
| 2021/0002085 | A1* | 1/2021 | Wade | B21D 28/02 |
| 2022/0088666 | A1 | 3/2022 | Bacci et al. | |

* cited by examiner

SPOILBOARD GASKET TILE SYSTEM FOR INCREASED WORK-HOLD VACUUM PRESSURE

RELATED APPLICATION

This application claims priority to U.S. Prov. Appl. No. 63/298,397, filed Jan. 11, 2022, entitled: GASKETED SPOILBOARD TILE SYSTEM FOR INCREASED WORK-HOLD VACUUM PRESSURE, by Michael Conor Murphy, et al., the contents of which are incorporated herein by reference.

TECHNICAL FIELD

The present disclosure relates generally to computer numerical control (CNC) machining systems, and, more particularly, to a spoilboard gasket tile system for increased work-hold vacuum pressure.

BACKGROUND

Computer numerical control or "CNC" (also simply "numerical control") is the automated control of machining tools (such as drills, lathes, mills, and 3D printers) by means of a computer. A CNC machine (or CNC router) is a motorized maneuverable tool (and often a motorized maneuverable platform) that processes a piece of material (metal, plastic, wood, ceramic, composite, etc.) to meet specifications by following a coded programmed instruction and without a manual operator directly controlling the machining operation. Various types of CNC machines include mills, lathes, plasma cutters, electric discharge machines (EDM), wire EDMs, sinker EDMs, multi-spindle machines, water jet cutters, punch presses, and so on.

"Workholding" is a term that describes any device or method used to firmly hold a workpiece while machining it (a "work-hold"), which is a critical component to precise CNC machining and other machining of workpieces. A "spoilboard" (or "spoil board", sacrificial board, bleeder board, etc.) is a disposable work surface mounted atop the CNC machine's permanent table to protect the table from damage as well as being an expendable surface that can participate in workholding. Typical spoilboards are made from medium density fiberboard (MDF) or low density fiberboard (LDF), though other materials may be used (e.g., plastics, etc.). Various methods are traditionally used to facilitate a work-hold with a spoilboard, such as, for example, screwing or nailing the workpiece into the spoilboard, taping and/or gluing the workpiece to the spoilboard, using clamps and/or tracks/slots with the spoilboard, and, most commonly and effectively, using vacuum tables to provide work-hold vacuum pressure on the workpiece.

Vacuum tables in particular are often the best solution for work done on CNC machines. In general, a porous spoilboard such as MDF/LDF is placed on top of a vacuum table, where its porousness allows the table to still pull a vacuum across the entire surface, holding the workpiece firmly in place against the spoilboard against side-force and up-force during machining. (A spoilboard needs to be solid enough that it doesn't compress when the vacuum pump is turned on, and needs to be porous enough to allow good vacuum airflow.) That is, vacuum tables generate hold-down force by is creating a vacuum under the workpiece, where atmospheric pressure pushes down from above (e.g., resulting in upwards of 15 lbs/in$^2$ of downforce). The hold-down force is proportional to the vacuum pressure and the surface area exposed to that pressure, thus while a large area on a large part can have significant force, smaller parts have much less force holding them down.

Notably, even though there have been many years of vacuum table usage and spoilboard adaptations, there still remains room for improvement with the work-holding performance of vacuum systems, particularly on CNC machine tables.

SUMMARY

According to one or more of the embodiments herein, systems and techniques provide for a spoilboard gasket tile system for increased work-hold vacuum pressure. In particular, a system in accordance with the techniques herein is based on creating a universal work-hold gasketing solution for vacuum table machining processes that can be used in a variety of sizes and applications. As described herein, the surface of a porous spoilboard (e.g., MDF/LDF or a porous plastic) is covered by a non-porous gasketing sheet (e.g., an adhesive foam layer) that is configured with a plurality of spaced apertures (holes) sized and located to create a corresponding plurality of focused vacuum passageways to suction clamp any workpiece placed thereon.

In one particular embodiment, the spoilboard with gasketing are prepared as an interchangeable tile unit, allowing for dynamic configuration and reconfiguration of an array of spoilboard gasket tiles to cover a vacuum table, as well as for replacement of specific tiles as needed based on localized wear of the tiles. In one embodiment, the tiles have interlocking joints (e.g., dovetails) on all four sides so that they securely fit together. In one embodiment, the edges of the tiles are sealed to provide increased "through-tile" vacuum pressure.

In one embodiment, the gasketing material is on both the top and the bottom surface of a tile to increase suction. In one embodiment, this center portion can be made from a non-porous material (e.g., a thin sheet of non-porous plastic, non-porous or laminated wooden sheets, etc.), and may have a plurality of "through-holes" to allow is passage of suction directly to the workpiece. In another embodiment, this center portion can be a porous spoilboard (e.g., MDF/LDF or a porous plastic), and may, though need not, have the "through-holes. Also, in either embodiment above, the bottom surface gasketing material may have an additional plurality of holes to allow increased suction to reach and hold the center portion to the underlying spoilboard or vacuum table.

In one embodiment, the spoilboard gasket tile system comprises a non-porous gasketing sheet with a "peel-and-stick" backing to adhesively affix to an underlaying spoilboard.

In one embodiment, different configurations of tiles may be used and/or interchanged, such as different aperture configurations or completely sealed tiles to redirect the maximum suction from the table to specified part locations.

Other embodiments of the present disclosure may be discussed in the detailed description below, including various combinations and replacements to the embodiments listed above, and the summary above is not meant to be limiting to the scope of the invention herein.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
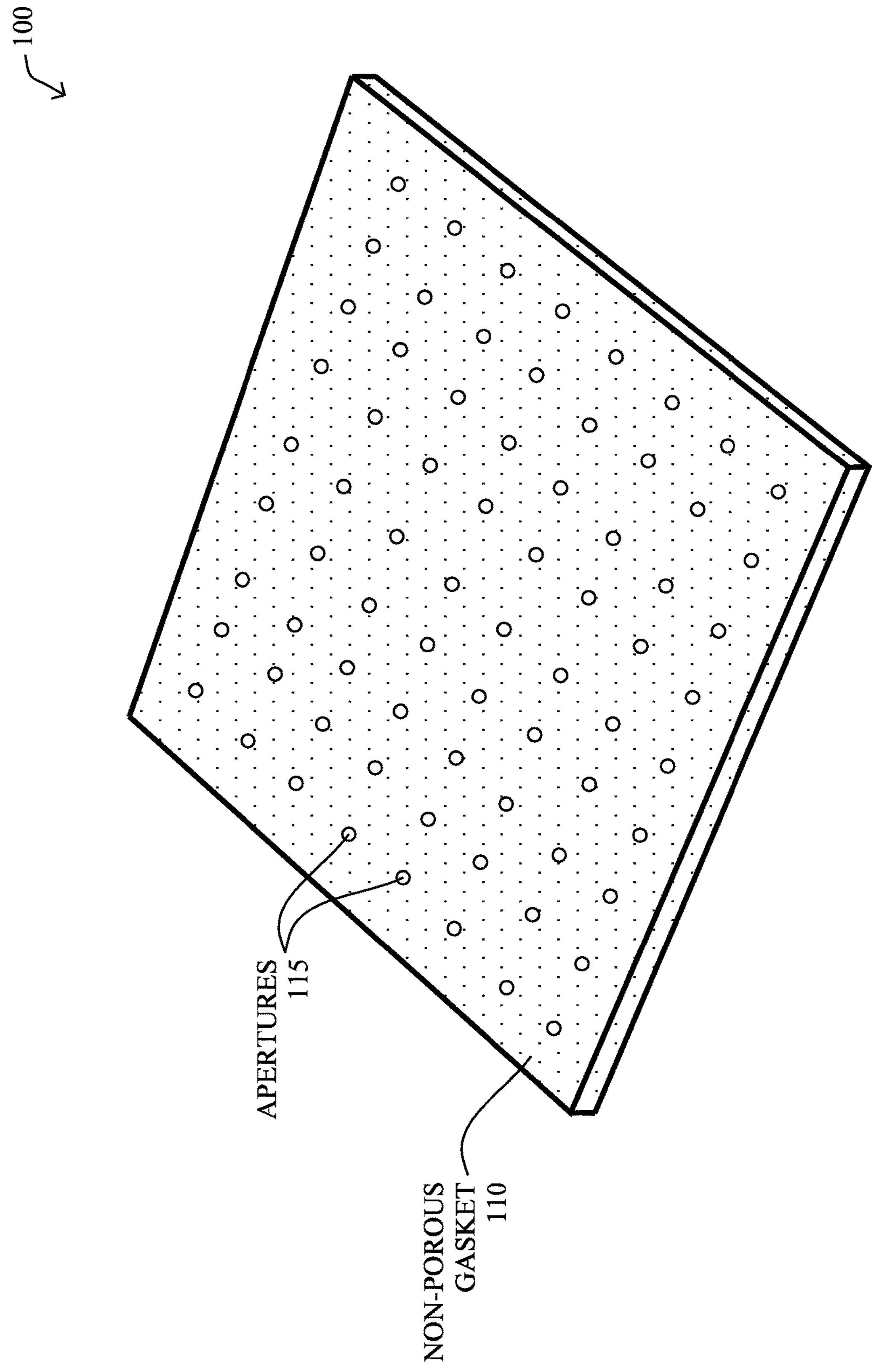
FIG. 1 illustrates an example of a spoilboard gasket tile.

As noted above, vacuum tables are often the best solution for work done on CNC machines. However, as also noted above, there still remains room for improvement with the work-holding performance of vacuum systems. For instance, when machinists have part movement on their vacuum tables (due to an insufficient vacuum system), it requires time to reset the system, resulting in lost parts and increased costs due to material wasted and time spent. One solution is to run parts slower through the machining process, or to cut a single part 2-3 times in order to reduce torque by the router bit (or other tools/bits), each of which being an inefficient process for the machinists.

A better solution, though, is to have a proper gasketing material and layout to create an air-tight seal, turning a downdraft system into a true vacuum clamping system. That is, gasketing acts as a compressible, closed-cell sealant that fills the small gap that exists between two solid surfaces. This microscopic void between the bottom of the spoilboard and the top of the table, if not properly sealed, causes vacuum pressure loss is when trying to utilize vacuum hold. But when gasketed properly, an air-tight, contained area is formed that the vacuum system pulls the atmosphere from, reducing vacuum pressure loss, creating more successful holds of workpieces, accordingly. (Notably, CNC manufacturers often instruct their customers to gasket their table to prevent vacuum loss under the spoilboard; however, this misses the important connection between vacuum tables holding the workpieces themselves, not merely the spoilboards). Spoilboard gasketing products thus help hold parts as they concentrate vacuum pressure and minimize vacuum pressure leak.

Specifically, for machinists who make the same part over and over as part of production runs, dedicated fixtures can be made for dedicated parts with in-board gasketing or cover gasketing. That is, when routing repetitive parts, the best solution may be to create a custom long-term reusable fixture (as opposed to a typical sacrificial spoilboard) to hold the workpieces. In this configuration, a non-porous fixture material may be used (e.g., birch, plastics, melamine, etc.), where a customized vacuum strategy, including gasketed channels or surface designs conforming generally to the shape of the workpiece, can be created for each piece for maximum work-hold pressure.

On the other hand, many CNC machines are tasked with performing short runs with a lot of turnover, rarely making the same thing more than a few times, and as such are in need of a universal system that will work for any part. Other CNC machines are configured for nested-based manufacturing (NBM), which is a system used to produce groups of components of any shape, nested closely together on sheets of flat raw material (e.g., composite wood panels, large solid wood panels, plastic sheets, etc.). Such environments are ill-suited for custom vacuum designs, and need a more generalized gasketing strategy to help assist the vacuum hold of a conventional spoilboard system.

The techniques herein, therefore, provide for a spoilboard gasket tile system for increased work-hold vacuum pressure. In particular, a system in accordance with the techniques herein is based on creating a universal work-hold gasketing solution for vacuum table machining processes that can be used in a variety of sizes and applications.

Specifically, the techniques herein are directed to a non-porous gasketing sheet that is configured with a plurality of spaced apertures (holes) sized and located to create a corresponding plurality of focused vacuum passageways to suction clamp any workpiece placed on a vacuum table. The gasketing sheets or panels may be placed the surface of a porous spoilboard material (e.g., MDF/LDF or a porous plastic) through various methods of adhesion, such as peel-and-stick adhesives, spray or roll-on adhesives, and so on. (Note that any spray or roll-on should preferably be applied to the gasket only so as to avoid sealing off the porous spoilboard material completely.) Since the gasket is non-porous, it seals the surface of the porous spoilboard, resulting in better efficient use of the vacuum system through the holes, creating hundreds or thousands of miniature "suction cups" to hold parts on the spoilboard surface.

The gasket material can vary in both thickness and density to fit a number of unique sets of machinist variables, particularly based on the substrate that is being held (e.g., types of wood, plastic, metals, etc.). Illustratively, the gaskets may be made from a foam gasketing material and may, in certain embodiments, have an adhesive backing. In one embodiment, the foam may specifically be a medium density closed-cell Polyvinyl Chloride (PVC) foam. The foam and an optional adhesive backing provide flexibility and conformability with strength and wear resistance, and, in particular, completely seals out air (e.g., at all times, or specifically when compressed, such as 30% or more). Generally, the gasket may be flexible, or may be generally rigid.

Figure 2:
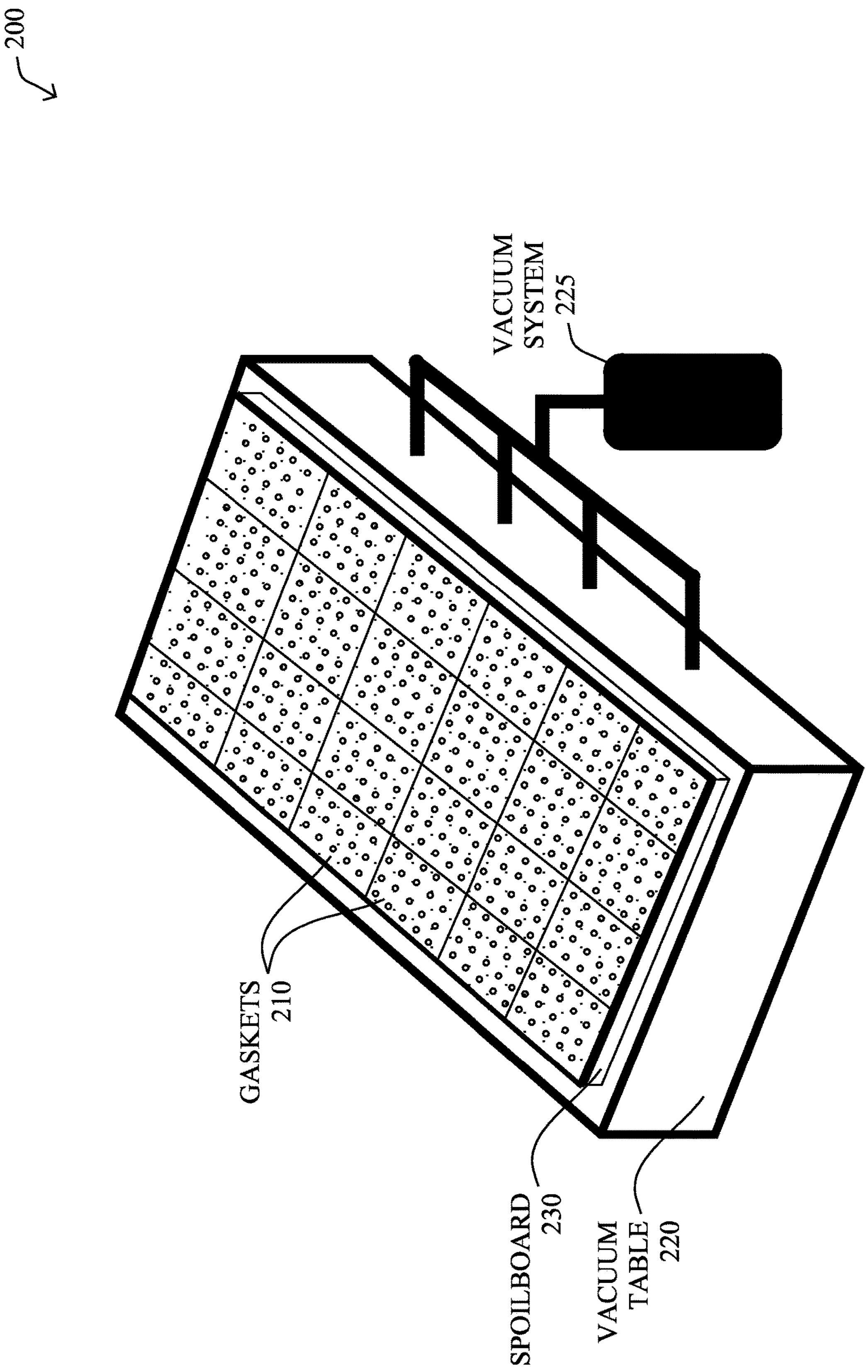
FIG. 2 illustrates an example of a vacuum table covered in an array of spoilboard gasket tiles.
Figure 3:
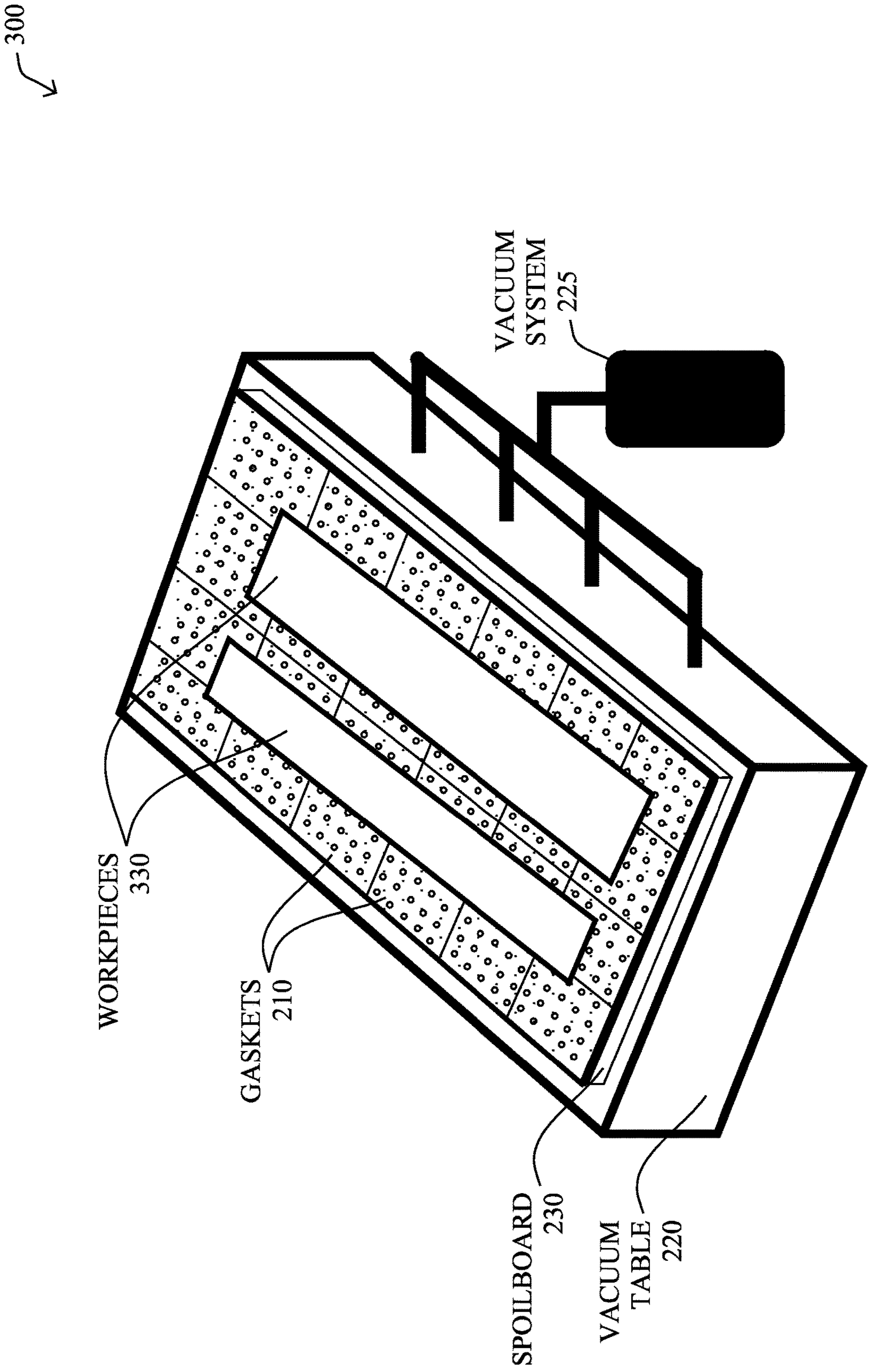
FIG. 3 illustrates an example of a CNC machine and workpiece on an array of spoilboard gasket tiles.

FIGS. 1-3 illustrate an example of the non-porous gasketing sheet with a plurality of spaced apertures (holes) and their application on spoilboards. For instance, FIG. 1 illustrates a single tile 100 of the gasket only (e.g., a 12"×16" gasket tile, where 24 tiles would be needed for a 4'×8' table). FIG. 2 illustrates an example 200 of gaskets 210 arranged on a vacuum table 220 (with vacuum system 225) with a spoilboard 230, generally completely covered in the gasket material herein. FIG. 3 further shows an example 300 of workpieces 330 placed on the gasket surface of FIG. 2. Also, various configurations using only certain portions of the vacuum table may be used, such as an elongated section of gasketing material for a correspondingly elongated workpiece and part cutout, where the remainder of the vacuum table may be sealed off to redirect the vacuum strength to the spoilboard location.

Any dimension of vacuum table may be used, and those shown are merely examples. Moreover, the gaskets may be arranged as individual tiles, as noted above, or as a table-sized roll/sheet (e.g., a single, much larger, tile).

Figure 4:
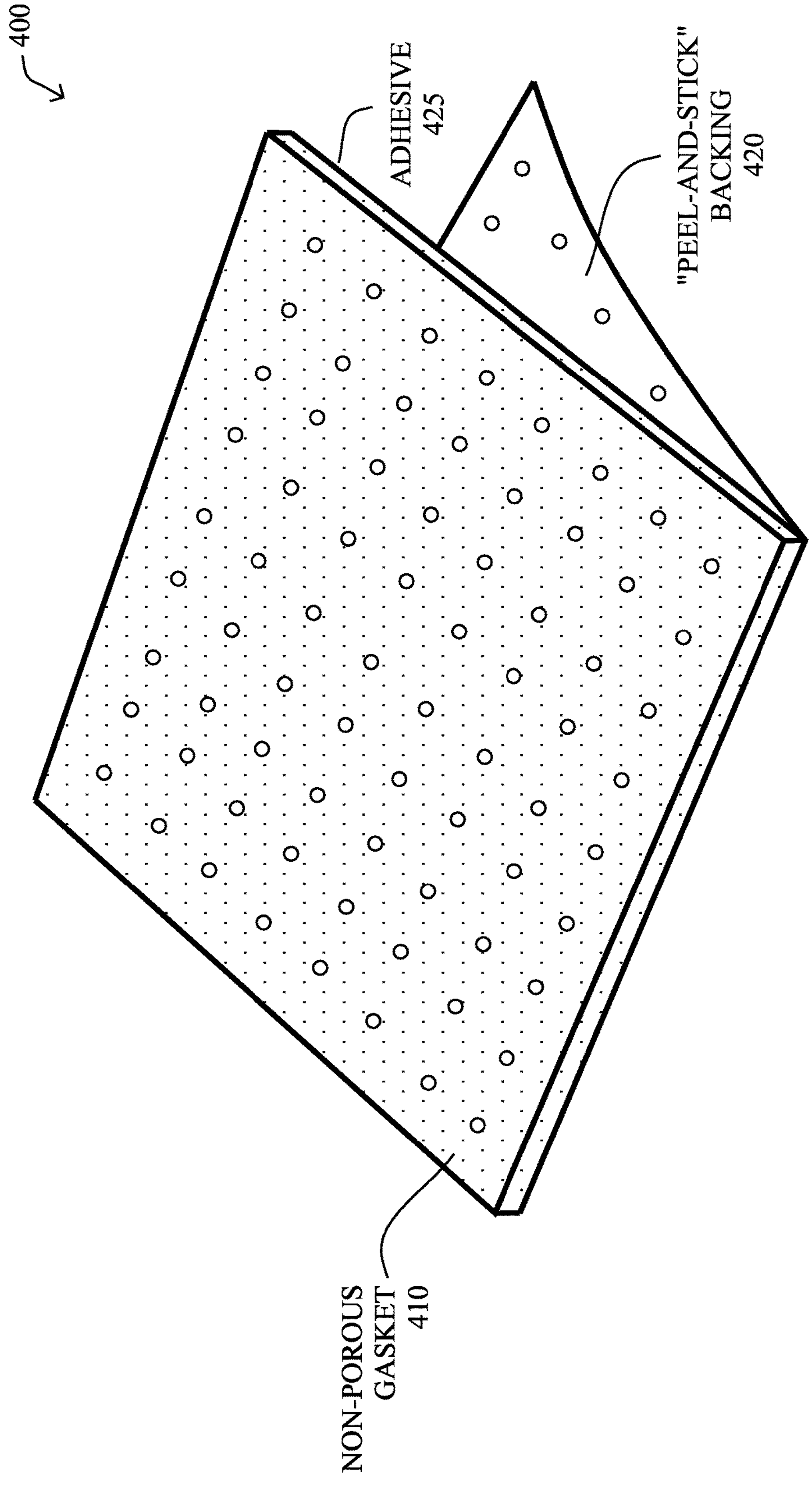
FIG. 4 illustrates an example of application of a "peel and stick" spoilboard gasket tile for adhesive application to a spoilboard.

Additionally, in one embodiment herein, the tiles may be configured with one side as having an adhesive layer, such as a "peel and stick" configuration. For instance, as shown in the example configuration 400 of FIG. 4, gasket tiles 410 may be placed onto a spoilboard by removing a peel-and-stick backing 420 from each tile, exposing adhesive layer 425, such that the machinist (or other installer) can carefully place the gaskets in a desired configuration across the surface of their spoilboard.

Notably, the apertures (holes) may be designed in a number of suitable arrangements. Illustratively, one pattern, as shown, is to have a 0.25" circular aperture (hole) spaced 1" apart in a square grid pattern. Other spacing, other arrangements, and other shapes of the apertures are also conceived herein. For example, spacing further apart results in fewer apertures, and increased suction, but more distance between such suction points. Sizing of the parts and/or workpiece may dictate the particular spacing chosen. The pattern/arrangement of the apertures may also be triangular, hexagonal (honeycomb), offset, or otherwise. Straight lines, in particular, may not always work well for straight or square projects (e.g., cabinet doors, skis, etc.), as offsetting the holes (e.g., not 90 degrees squared off as shown) would allow the workpieces/parts to be staggered across the holes, preventing perfect alignment the with hole pattern. Still, too, other projects with different shapes may benefit from differing patterns, accordingly. Further, the shapes of the apertures themselves may be circular (as shown), square, triangular, hexagonal, elongated (e.g., rectangles, ovals, etc.), and so on. Different sizes, arrangements, shapes, and so forth would result in different vacuum properties and may affect different workpieces different depending on size, material, surface properties, etc. Also, each tile used may have the same pattern, or different tiles with different patterns may be used. For example, more or fewer holes may be used in certain locations where parts are expected to be placed.

Production of the gasket apertures may be based on using a clicker press machine to die cut a pre-set pattern on each tile, though other techniques such as laser cutting, roller cutting, press cutting, punching, drilling, and so on may be used to produce the is desired patterns.

According to one or more specific embodiments of the present disclosure, the gasketing may be prepared with the spoilboard as an interchangeable tile unit, allowing for dynamic configuration and reconfiguration of an array of spoilboard gasket tiles to cover a vacuum table, as well as for replacement of specific tiles as needed based on localized wear of the tiles. In this manner, machinists need not self-peel tile gaskets and stick them down to the spoilboard themselves, but instead can merely place all-in-one spoilboard gasket tiles on their vacuum table.

Figure 5:
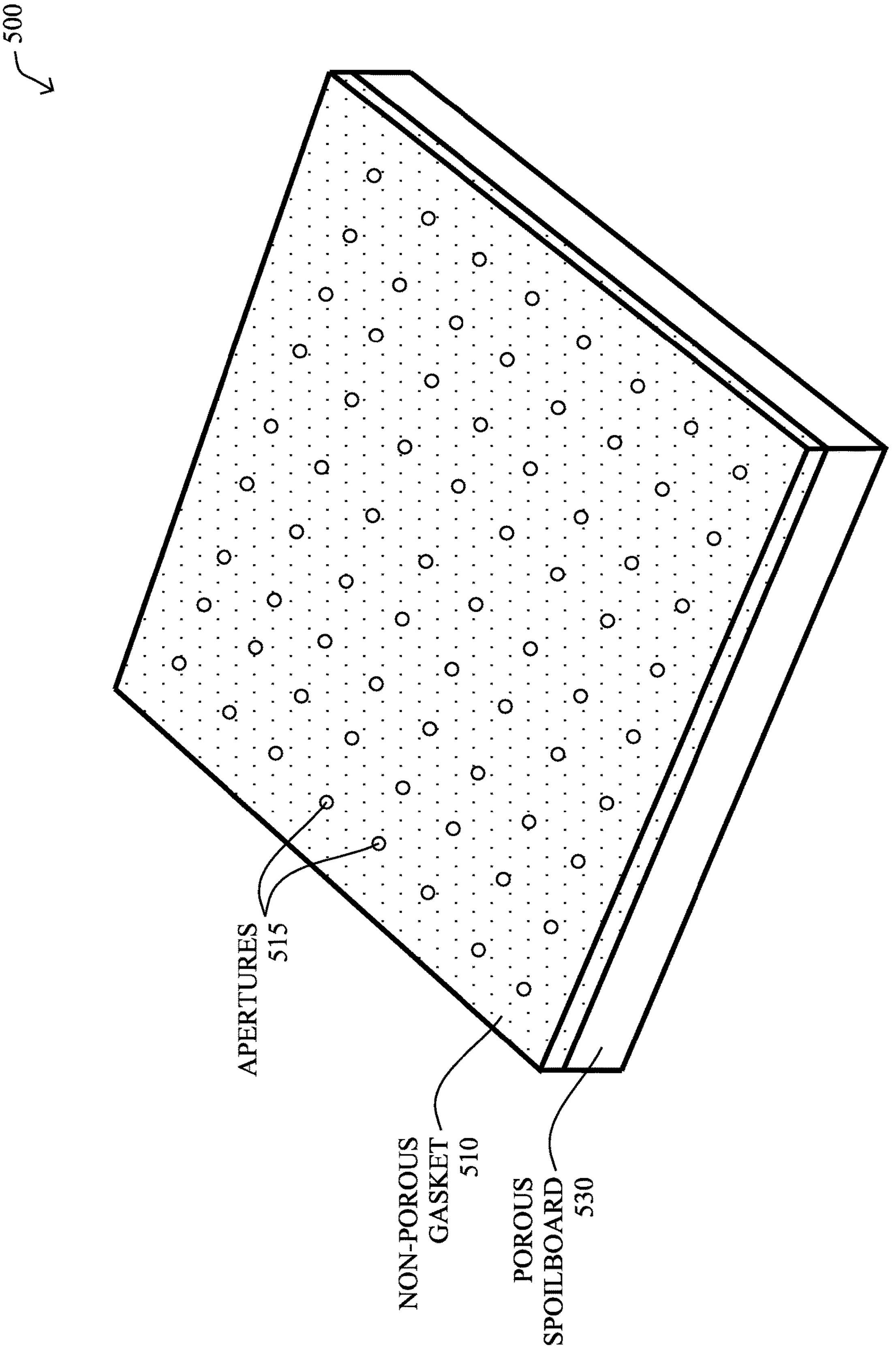
FIG. 5 illustrates an example of a spoilboard gasket tile with integrated spoilboard component.

For instance, FIG. 5 illustrates an example spoilboard gasket tile 500 with integrated spoilboard (top perspective view) according to one or more embodiments herein, showing the non-porous gasket material 510 with apertures 515 atop the porous spoilboard substrate 530. In one example embodiment, the tiles may be 12"×12" to adapt to a variety of standard table sizes, such as 4'×8', 5'×10', 4'×20', etc., or any suitable size/dimension, such as 24"×24", and so on. The spoilboard material may be MDF, LDF, porous plastics or composites, and so on, and may have a thickness generally between ⅛" and 1" thick (e.g., ¼-½" preferred).

In general, for this embodiment, the spoilboard substrate 530 base may first be resurfaced on each side (e.g., with a face milling cutter) to ensure that it is flattened (as typical MDF/LDF thickness can vary across a sheet), and to remove any surface "facing" of the panel to allow proper airflow, since the outer surfaces of manufactured fiberboard are often sealed and non-porous (or at least reduced porousness when compared to the center of the board). The gasketing material 510 may then be adhered to the resurfaced face of the spoilboard.

Figure 6:
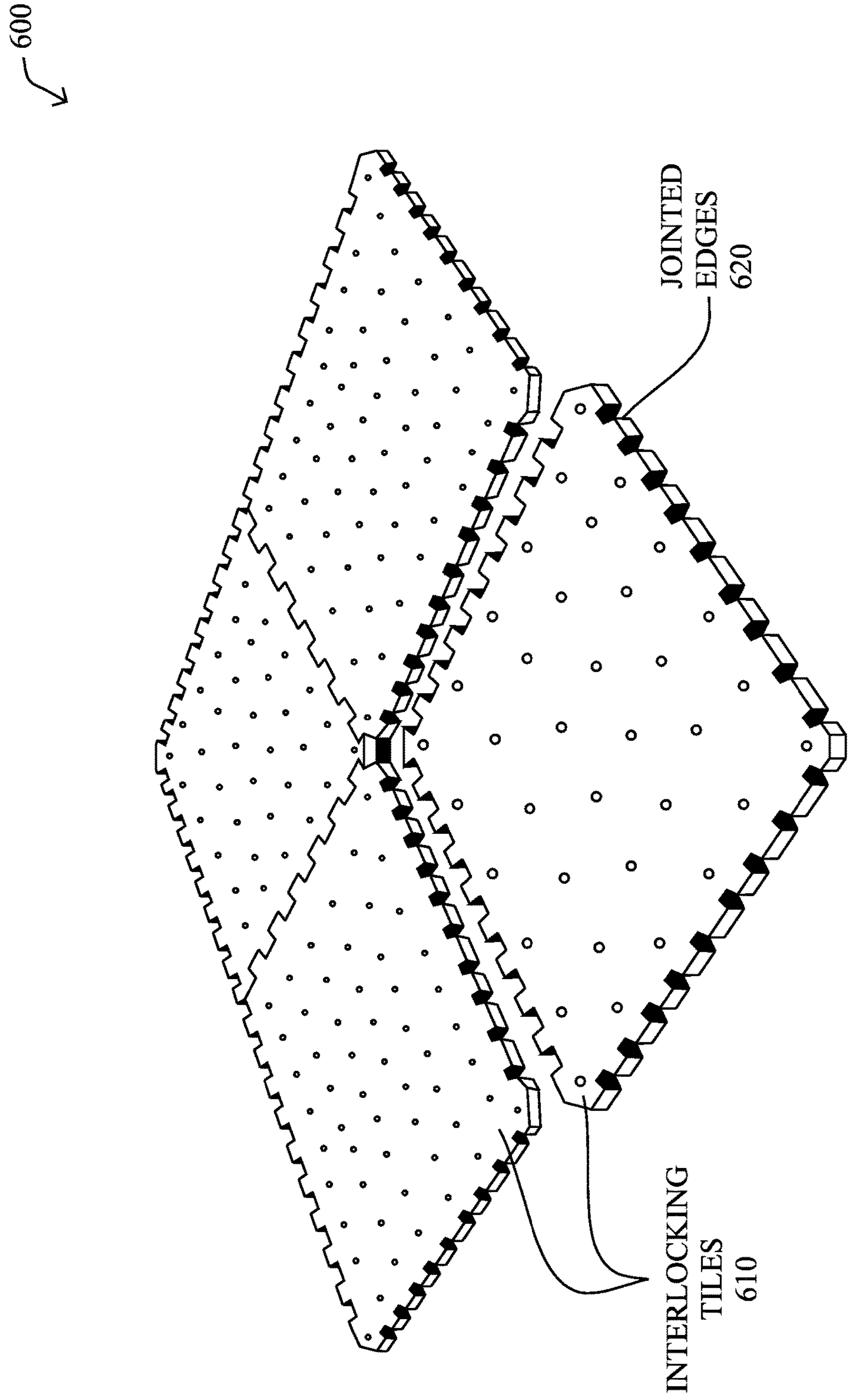
FIG. 6 illustrates an example of a system of interconnected spoilboard gasket is tiles.

In one embodiment, the tiles have interlocking joints (e.g., dovetails) on all four sides so that they securely fit together. For example, as shown in FIG. 6, each interlocking tile 610 of tiles 600 has jointed edges 620 on all sides, allowing for interconnection between the adjacent tiles. Other types of joints, such as butt joints (as in FIG. 5 above), tongue and groove joints, dowels, biscuit joints, half lap joints, finger joints, and so on may also be used. Note that certain types of joints may allow for removing and adding single tiles at a time from anywhere within the resultant array of tiles, while other types of joints may require full or partial disassembly of an array in order to replace tiles. Note further that it is important to keep all tiles at the same height (though compression of the gasketing material will assist in leveling small variances in the top surfaces), so various locking mechanisms and/or keying systems may be used to ensure that the interlocked tiles are fully engaged at substantially equal heights, such as cam locks/nuts or other fasteners.

Notably, in one embodiment, the edges of the tiles (spoilboard substrate 530 above) may be sealed to provide increased "through-tile" vacuum pressure. That is, the outermost tiles may have an additional seal around their outward-facing edges, or else each tile may independently be sealed around its outer edge. That is, much of the airflow may bleed out of the edges without sealing the outer edge, resulting in little vacuum at the top of the spoilboard where it is needed. There are a number of ways the edges of a spoilboard may be sealed, such as, e.g., applying edgebanding, painting the edges, coating the edges with glue, taping the edges, and so on. Also, in certain embodiments, additional gasketing may be provided at the joints between tiles to prevent free flow of the vacuum system through the seams/joints.

Figure 7:
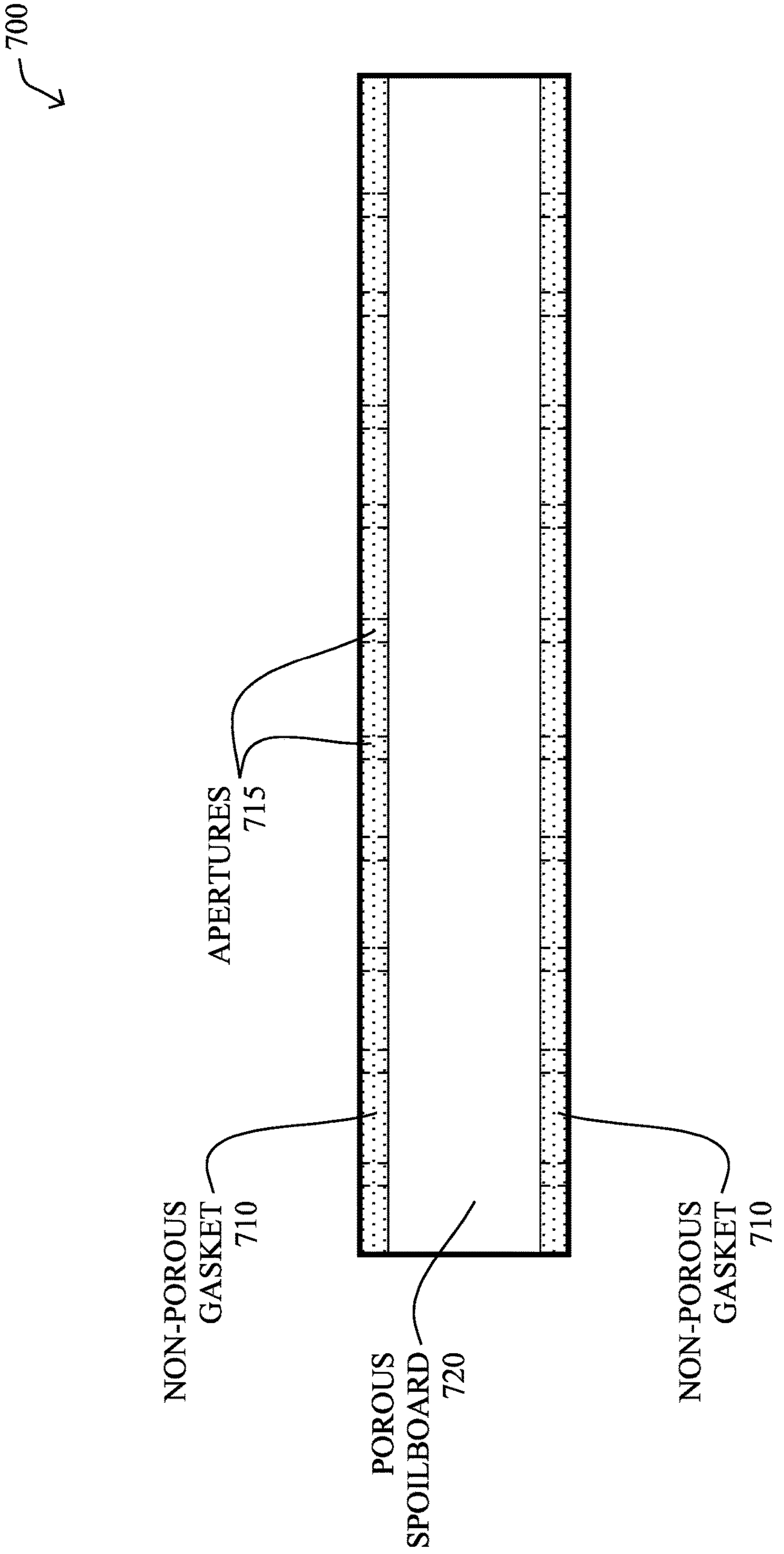
FIG. 7 illustrates an example of a dual-sided spoilboard gasket tile with integrated spoilboard.

According to one or more embodiments herein, and with reference to FIG. 7, a dual-sided tile 700 the gasketing material 710 (with apertures 715) may be located on both the top and the bottom surface of the spoilboard substrate 720 to further increase suction. Additionally, this arrangement may allow for flipping the tile over when one side starts to wear down (e.g., for double life of the tile). While the underside of the tile at that point may have been scored, it is more important that the top surface and its apertures to be in better condition to have a more supportive vacuum hold. Note further that the different sides of the tile may have the same gasket design or different gasket designs.

Figure 8:
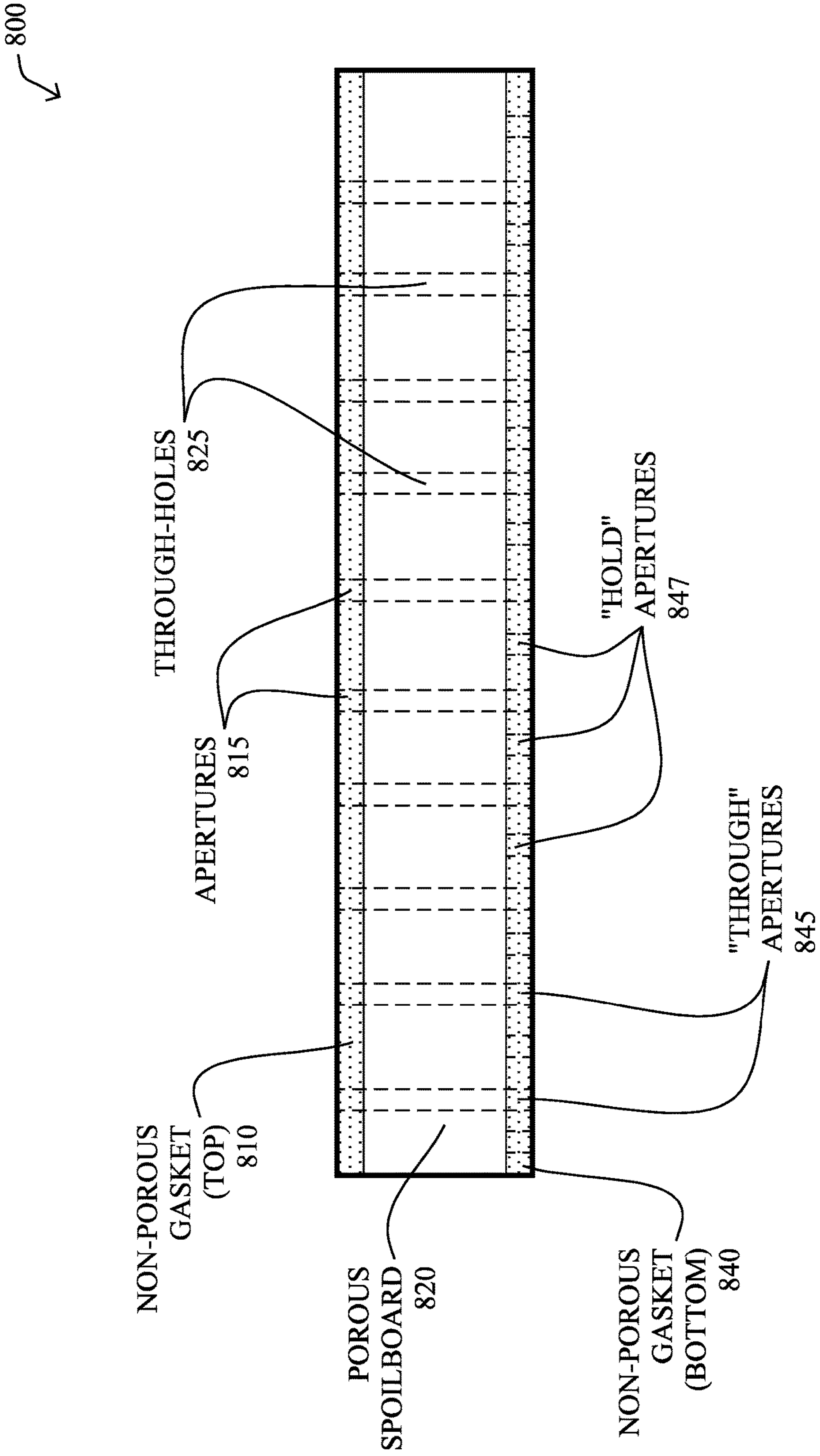
FIG. 8 illustrates an example of a dual-sided spoilboard gasket tile with integrated spoilboard and "through-holes" and "hold-holes"

FIG. 8 illustrates an alternative embodiment of a dual-sided tile 800, where in addition to top gasketing material 810 with apertures 815, the porous spoilboard substrate 820 may now have a plurality of apertures or "through-holes" 825, e.g., drilled or machined through, to allow passage of suction directly to the workpiece. As such, the bottom gasketing material 840 may also have matching "through-holes" or "through-apertures" 845. In one embodiment in particular, the bottom surface gasketing material 840 may also have an additional plurality of holes or "hold apertures" 847 to allow increased suction from the vacuum table (or underlying spoilboard surface) to reach and hold the center portion (porous spoilboard 820 in this example) to the underlying spoilboard or vacuum table, accordingly.

In particular, according to certain embodiments herein, there are additional holes on the bottom of the tile to create a "first clamp" that vacuums the tiles themselves to the spoilboard (or vacuum table), and then the holes through the tiles get vacuum unobstructed from the spoilboard/table through to the workpiece with a series of sealed "second clamps" through the top apertures 815 of the top gasket 810.

Figure 9:
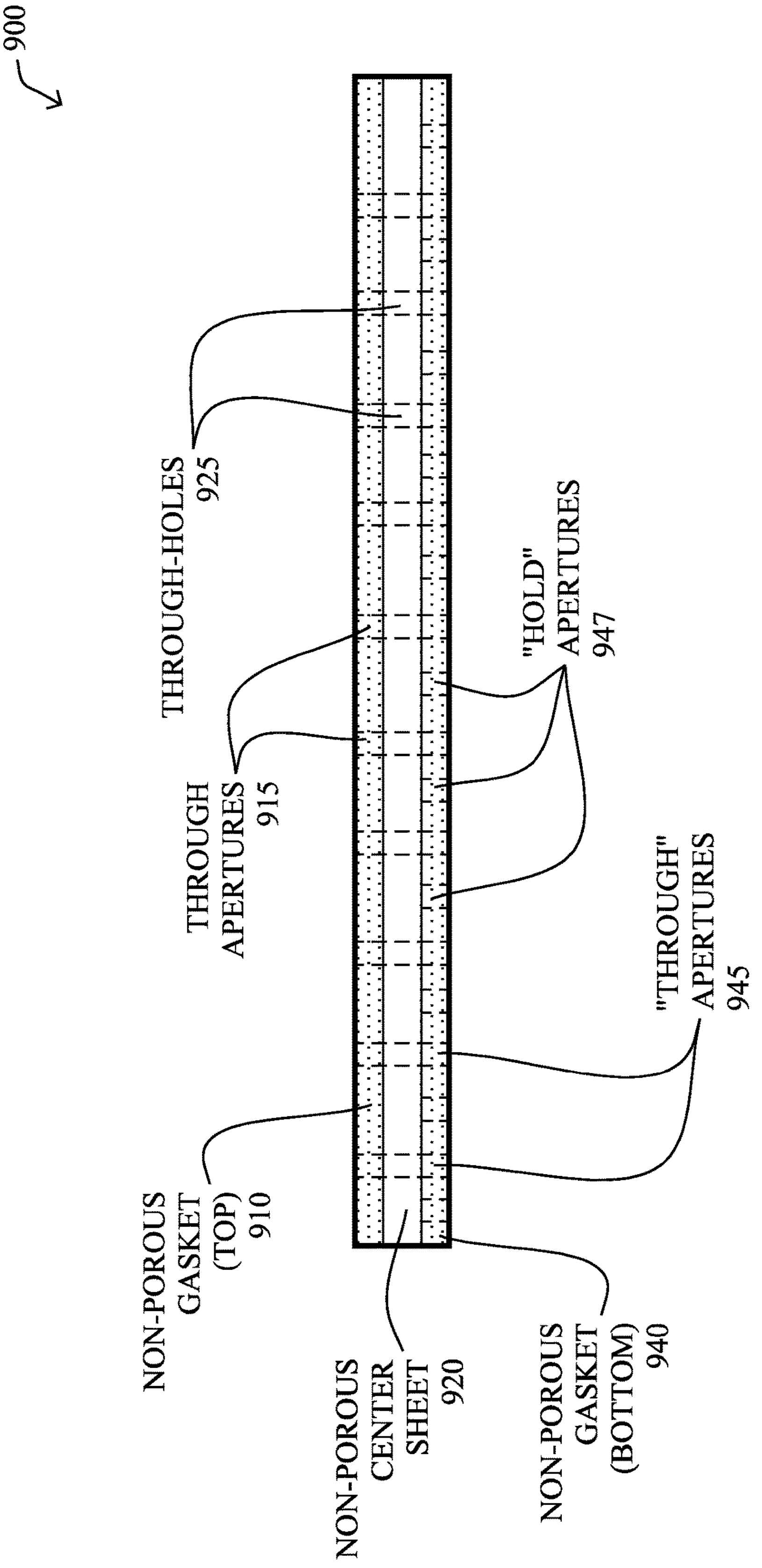
FIG. 9 illustrates an example of a dual-sided spoilboard gasket tile with non-porous center sheet and "through-holes" and "hold-holes"

As still another embodiment herein, FIG. 9 illustrates an example dual-sided spoilboard gasket tile 900 for increased work-hold vacuum pressure. In particular, tile 900 may have similar configuration to tile 800 of FIG. 8 above, such as having a non-porous top gasket 910 (with through apertures 915) and a non-porous bottom gasket 940 (with through apertures 945 and hold apertures 947), but here the center sheet 920 may consist of a non-porous center "sheet" (e.g., a thin sheet of non-porous plastic, non-porous or laminated wooden sheets, etc.), where the center sheet 920 has a plurality of "through-holes" 925 to allow passage of suction directly to the workpiece.

Specifically, in one preferred embodiment, center sheet 920 is a non-porous material, unlike an MDF spoilboard, to be more air-tight for creating a vacuum clamp to hold down the tile 900 because there is no leak. Generally, this design may be used on top of installed spoilboards as opposed to the vacuum tables themselves, particularly to have fewer vacuum leaks than placing tiles directly onto a vacuum table, and also by putting them on top of a spoilboard they are used/reused/placed/replaced much more easily than if they were locked onto a vacuum table. Moreover, the tiles 900 herein do not cause concern with dust collection as the MDF layer spoilboard that is between the vacuum table and the tiles 900 will not allow dust into the table.

Figure 10:
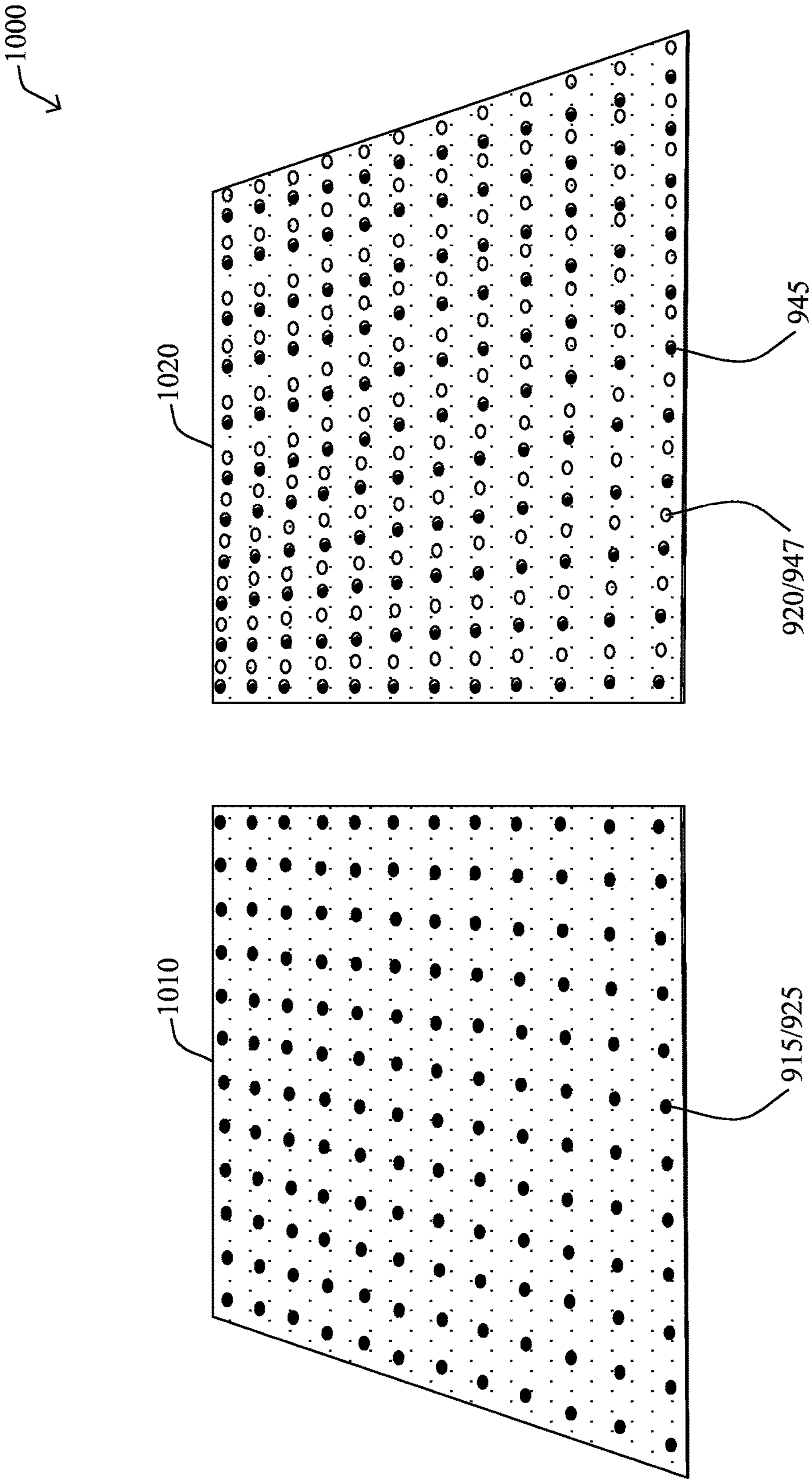
FIG. 10 illustrates an example of a dual-sided spoilboard gasket tile from the top and bottom with "through-holes" and "hold-holes"

FIG. 10 illustrates an example view 1000 of both the top 1010 and bottom 1020 of the example dual-sided spoilboard gasket tile 900 above with non-porous center sheet 920 appearing through the hold-holes 947 from the bottom view 1020 (and also through-is holes 945), but only showing the through-holes 915/925 from the top 1010.

One benefit of the system herein is that individual gasket tiles, or more particularly individual spoilboard gasket tiles, can be replaced as needed, such as based on wear over time from being sacrificed during machining. For instance, a single job or repeated jobs of the same part can produce scours in the gasketing material, while many different jobs can greatly wear out the entirety of the gasket over time. As such, machinists may find that their vacuum pressure is affected, or their level surface is compromised. According to the techniques herein, therefore, individual tiles (alone or in sets of tiles) may be replaced, flipped, etc., to produce a new work surface in those respective areas.

Figure 11:
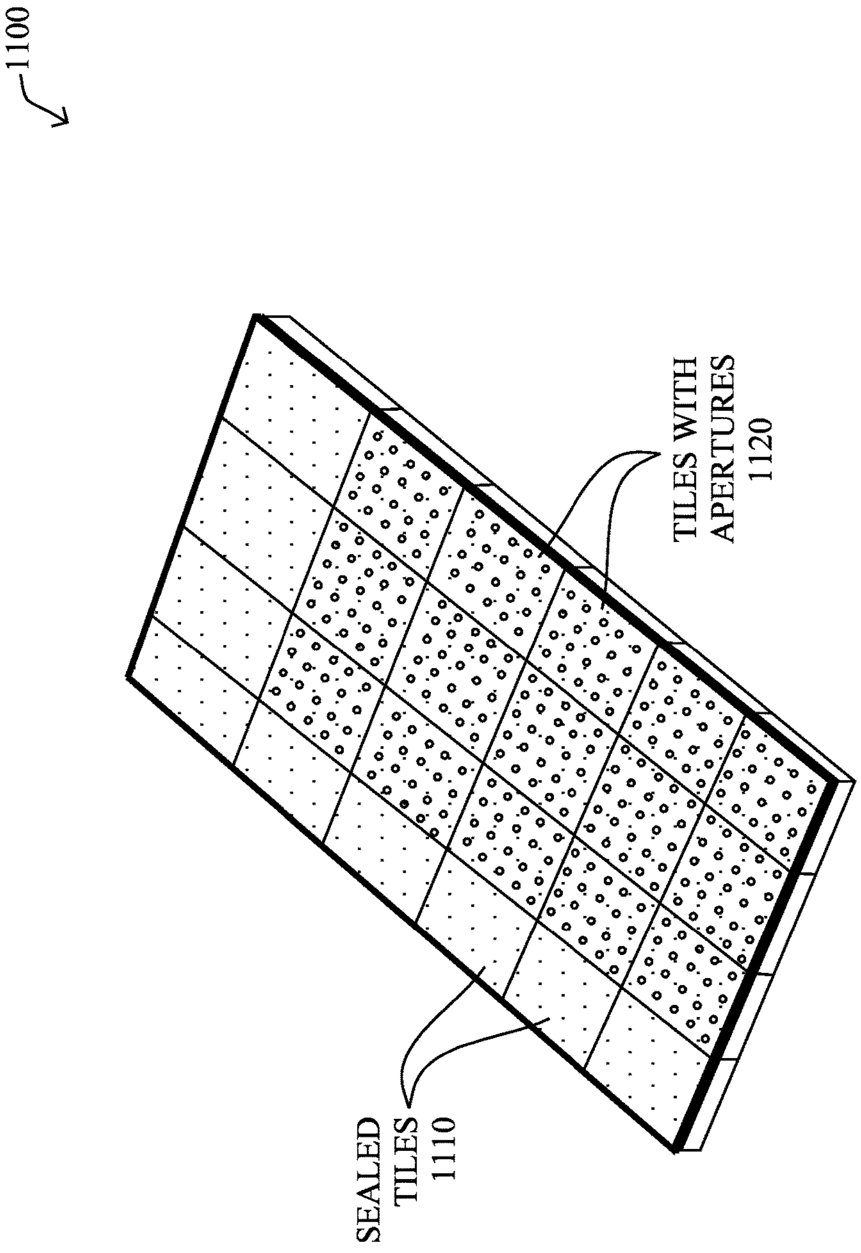
FIG. 11 illustrates an example of a dynamically designed interchangeable spoilboard gasket tile system.

Furthermore, different configurations of tiles may be used and/or interchanged, such as different aperture configurations on different areas of the vacuum table, or completely sealed tiles to redirect the maximum suction from the table to specified part locations. For instance, as shown in the simplified illustration 1100 of FIG. 11, assume that a 4'×6' table is being used, but only a 3'×5' section is needed for a particular project. As shown, one row (e.g., top) and one column (e.g., left side) of the tiles may be arranged as sealed tiles 1110 (e.g., solid gasket material) as being outside of "working part area", resulting in greater vacuum strength focused on the tiles 1120 with the apertures in the gasket (rather than across the entire table). Other configurations are also conceived herein, such as different aperture spacing/sizes/shapes, different density of apertures, and so on, and the view of "sealed or with apertures" is merely an example of a customizable configuration based on the interchangeable tile system described herein.

Advantageously, the techniques herein thus provide for a spoilboard gasket tile system for increased work-hold vacuum pressure. In particular, the techniques herein allow CNC machinists to hold their workpieces better, in order to cut them better, and thus to produce a better (and more profitable) product. The vacuum improvements offered by the system herein allow for better holding of workpieces for finishing machined parts in a single pass, particularly for small batch parts, nested-based manufacturing environments, or other environments where the CNC machines and vacuum tables are faced with consistently changing tasks in an ever-changing job environment. Additionally, the system herein alleviates the need for machinists to create "onion skins" or "tab cuts" or other techniques used in the art to address insufficient vacuum hold. The spoilboard gasket tile system herein thus provides a quick, easy, dynamic, and inexpensive system to increase work-hold vacuum pressure, which is extremely effective for secure holding of a plethora of different types of parts during CNC machining. Moreover, the techniques herein prevent vacuum leaks from occurring through channels of an exposed spoilboard.

For example, without the spoilboard gasket tiles herein, a machinist on a typical cutting project may place the workpiece on their spoilboard, and with the vacuum table on, could still supply enough lateral force to slide the workpiece on the spoilboard. However, with the spoilboard gasket tiles herein, a machinist could not move the workpiece, demonstrating the vastly increased vacuum pressure on the workpiece, and the security needed to ensure stability during machining, accordingly.

In closing, according to one or more embodiments herein, an illustrative spoilboard gasket tile may comprise: a substrate material having a top surface and a bottom surface, the substrate material being substantially planar; a non-porous gasket material affixed to the top surface of the substrate material, the non-porous gasket material being substantially planar; and a plurality of apertures established within the non-porous gasket material.

In one embodiment, the spoilboard gasket tile may further comprise: a second non-porous gasket material on the bottom surface of the substrate material, the second non-porous gasket material being substantially planar; and a plurality of apertures established within the second non-porous gasket material. In one embodiment, the spoilboard gasket tile may further comprise: a plurality of apertures established within the substrate material, wherein the plurality of apertures established within the substrate material substantially align with both the plurality of apertures established within the non-porous gasket material and plurality of apertures established within the second non-porous gasket material. In one embodiment, the spoilboard gasket tile may further comprise: a plurality of secondary apertures established within the second non-porous gasket material that do not align with the plurality of apertures established within the is substrate material. In one embodiment, the substrate material is non-porous. In one embodiment, the substrate material is less than ¼-inch thick. In one embodiment, the substrate material is selected from a group consisting of: plastic; wood; laminated fiberboard; and vinyl. In one embodiment, the spoilboard gasket tile may further comprise: a peel-and-stick adhesive layer on a surface of the second non-porous gasket material opposite the bottom surface of the substrate material.

In one embodiment, the substrate material is a porous spoilboard material. In one embodiment, the porous spoilboard material comprises fiberboard.

In one embodiment, the substrate material is between ⅛-inch and 1-inch thick.

In one embodiment, the spoilboard gasket tile may further comprise: one or more connector features on one or more edges of the substrate material configured for interconnection with one or more other spoilboard gasket tiles.

In one embodiment, the non-porous gasket material comprises a foam gasketing material. In one embodiment, the foam gasketing material comprises medium density closed-cell Polyvinyl Chloride foam.

In one embodiment, the spoilboard gasket tile may further comprise: an adhesive layer between the non-porous gasket material and the substrate material to adhere the non-porous gasket material to the substrate material.

According to one or more additional embodiments herein, an illustrative spoilboard gasket tile may comprise: a substantially planar non-porous gasket material, the substantially planar non-porous gasket material having a planar surface area between 25 square inches and nine square feet and being less than ¼-inch thick, the substantially planar non-porous gasket material having a top surface and a bottom surface; a plurality of apertures established within the substantially planar non-porous gasket material; an adhesive layer on the bottom surface of the substantially planar non-porous gasket material, the adhesive layer configured to adhere the substantially planar non-porous gasket material to a spoilboard substrate material; and a peel-away material affixed over substantially all of the adhesive layer and configured to allow user-removal of the peel-away material to expose the adhesive layer.

According to one or more embodiments herein, an illustrative system may comprise: a vacuum table; a porous spoilboard substrate disposed on a top surface of the vacuum table, the porous spoilboard substrate being substantially planar; and one or more spoilboard gasket tiles disposed on a top surface of the porous spoilboard substrate, the one or more spoilboard gasket tiles being substantially planar and consisting of: a non-porous gasket material; and a plurality of apertures established within the non-porous gasket material.

In one embodiment, the one or more spoilboard gasket tiles are adhered to spoilboard with an adhesive.

In one embodiment, the one or more spoilboard gasket tiles further comprise: a center substrate material, wherein the non-porous gasket material is on a top surface of the center substrate material; a second non-porous gasket material on a bottom surface of the center substrate material; a plurality of apertures established within the second non-porous gasket material; a plurality of apertures established within the center substrate material, wherein the plurality of apertures established within the center substrate material substantially align with both the plurality of apertures established within the non-porous gasket material and plurality of apertures established within the second non-porous gasket material; and a plurality of secondary apertures established within the second non-porous gasket material that do not align with the plurality of apertures established within the center substrate material.

In one embodiment, the system further comprises: a computer numerical control machining tool.

While there have been shown and described illustrative embodiments, it is to be understood that various other adaptations and modifications may be made within the scope of the embodiments herein. For example, while the embodiments may have been demonstrated with respect to CNC machining environments and form factors, other configurations of vacuum tables for other purposes may also take advantage of the embodiments herein that would remain within the contemplated subject matter of the description above. Also, while certain materials have been shown, other materials with similar properties (e.g., porous, non-porous, etc.) may be used herein. Also, is combinations from certain embodiments shown above may be used herein, such as, for example, using a peel-and-stick adhesive layer on the bottom gasket of tile 900 above for better adhesion, and so on.

Furthermore, in the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or materials have not been described in detail so as not to obscure the discussion. Moreover, while certain scales, sizes, numbers, and so on have been shown and described, such details are not meant to be limiting to the embodiments herein.

In particular, the foregoing description has been directed to specific embodiments. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A vacuum-pressure-improving, spoilboard tile for CNC machine vacuum tables, the spoilboard tile comprising:

a porous spoilboard substrate that is planar and that has a spoilboard thickness, the porous spoilboard substrate having a top spoilboard surface and a bottom spoilboard surface;

a first non-porous gasket layer that is substantially planar and that has a first thickness that is less than the spoilboard thickness, the first non-porous gasket layer having a first top surface and a first bottom surface;

a first adhesive layer positioned between the first bottom surface of the first non-porous gasket layer and the top spoilboard surface of the porous spoilboard substrate, the first adhesive layer adhering the first non-porous gasket layer to the porous spoilboard substrate on the top spoilboard surface;

a second non-porous gasket layer that is substantially planar and that has a second thickness that is less than the spoilboard thickness, the second non-porous gasket layer having a second top surface and a second bottom surface; and a second adhesive layer positioned between the second top surface of the second non-porous gasket layer and the bottom spoilboard surface of the porous spoilboard substrate, the second adhesive layer adhering the second non-porous gasket layer to the porous spoilboard substrate on the bottom spoilboard surface;

wherein the first non-porous gasket layer comprises a plurality of apertures arranged in a distributed pattern, and where in the second first non-porous gasket layer comprises a plurality of apertures arranged in the distributed pattern, further wherein the porous spoilboard substrate comprises a plurality of through-holes extending from the top spoilboard surface to the bottom spoilboard surface, the plurality of through-holes of the porous spoilboard substrate being arranged in the distributed pattern and substantially aligned with the plurality of apertures of the first non-porous gasket layer and the plurality of apertures of the second non-porous gasket layer, such that the corresponding apertures of the first non-porous gasket layer, corresponding though-holes of porous spoilboard substrate, and corresponding apertures of the second non-porous gasket layer are positioned in same locations across the spoilboard tile, define a common diameter and are axially aligned to provide continuous airflow paths through the spoilboard tile;

wherein the spoilboard tile is individually replaceable when assembled among an array of replaceable spoil board tiles on the CNC machine vacuum table.

2. The spoilboard tile of claim 1, wherein the distributed pattern for the plurality of apertures is an offset grid pattern configured to balance vacuum distribution across the first top surface of the first non-porous gasket layer or the second top surface of the second non-porous gasket layer.

3. The spoilboard tile of claim 1, wherein the first non-porous gasket layer and the second non-porous gasket layer comprise a medium-density closed-cell polyvinyl chloride foam material.

4. The spoilboard tile of claim 1, wherein the porous spoilboard substrate comprises a medium-density fiberboard material.

5. The spoilboard tile of claim 1, wherein the first non-porous gasket layer and the second non-porous gasket layer further comprise seam-gasketing material positioned along one or more peripheral edges of the porous spoilboard substrate and configured to impede vacuum leakage at joints between adjacent spoilboard tiles when assembled in the array.

6. The spoilboard tile of claim 1, wherein the porous spoilboard substrate comprises interlocking edges along at least two sides configured to engage with complementary interlocking edges of adjacent spoilboard substrates of the array of replaceable spoilboard tiles, and wherein the seam-gasketing material is positioned at interfaces between the interlocking edges.

7. The spoilboard tile of claim 6, wherein the interlocking edges comprise tongue-and-groove joints configured to prevent air leakage between adjacent gasket layers.

8. The spoilboard tile of claim 1, wherein the top spoilboard surface and first non-porous gasket layer are interchangeable with the bottom spoilboard surface and second non-porous gasket layer such that the spoilboard tile is reversible to extend usable service life.

9. The spoilboard tile of claim 1, wherein the spoilboard tile is a square.

10. The spoilboard tile of claim 1, wherein the second non-porous gasket layer further comprises a plurality of hold apertures configured to locally increase vacuum holding force at selected locations of the spoilboard tile.

* * * * *